(12) United States Patent
Dietschreit

(10) Patent No.: US 9,931,645 B2
(45) Date of Patent: Apr. 3, 2018

(54) CENTRIFUGE BASKET FOR A SCREEN CENTRIFUGE

(71) Applicant: Siebtechnik Gmbh, Mülheim an der Ruhr (DE)

(72) Inventor: Horst Dietschreit, Mülheim an der Ruhr (DE)

(73) Assignee: Siebtechnik GmbH, Mulheim an der Ruhr (DE)

( * ) Notice: Subject to any disclaimer, the term of this patent is extended or adjusted under 35 U.S.C. 154(b) by 466 days.

(21) Appl. No.: 14/618,340

(22) Filed: Feb. 10, 2015

(65) Prior Publication Data

US 2015/0231537 A1    Aug. 20, 2015

(51) Int. Cl.
*B04B 3/00* (2006.01)
*B04B 7/08* (2006.01)
*B04B 7/16* (2006.01)
*B04B 7/18* (2006.01)
*B01D 33/74* (2006.01)
*B01D 35/30* (2006.01)

(52) U.S. Cl.
CPC .............. *B04B 7/16* (2013.01); *B01D 33/74* (2013.01); *B01D 35/30* (2013.01); *B04B 3/00* (2013.01); *B04B 7/08* (2013.01); *B04B 7/18* (2013.01)

(58) Field of Classification Search
CPC .... B04B 3/00; B04B 7/08; B04B 7/16; B04B 7/18; B01D 33/74; B01D 35/30
See application file for complete search history.

(56) References Cited

FOREIGN PATENT DOCUMENTS

| DE | 1967178 U | 8/1967 | |
|---|---|---|---|
| DE | 6928975 U | 11/1969 | |
| DE | 83 09 438 | 5/1988 | |
| DE | 4244421 A1 | 6/1994 | |
| DE | 102004057859 A1 * | 6/2006 | ............... B04B 7/18 |
| DE | 102004057859 A1 | 6/2006 | |
| FR | 435 457 A | 3/1912 | |
| WO | WO 116245 A1 | 10/2008 | |
| WO | WO 2008116245 A1 * | 10/2008 | ............... B07B 1/22 |

OTHER PUBLICATIONS

European Search Report dated Jun. 2015.

* cited by examiner

*Primary Examiner* — David A Reifsnyder
(74) *Attorney, Agent, or Firm* — Law Offices of Robert F. Zielinski, LLC

(57) ABSTRACT

The invention relates to a centrifuge basket for a screen centrifuge, in particular a screen helical-conveyor, a push-type or vibrating screen centrifuge, with an outer conical supporting basket (10, 20) and screen segments (12, 22, 32) enclosed in the supporting basket (10, 20), the supporting basket (10, 20) on its rear edge having an annular groove (17) into which the screen segments (12, 22, 32) are positively inserted, the screen segments (12, 22, 32) on their side facing the supporting basket (10, 20) having at least one clip (13, 23, 33) which is transversed by at least one screw (15, 25) and by means of which the screen segments (12, 22, 32) are detachably fixed on the front edge of the supporting basket (10, 20).

18 Claims, 11 Drawing Sheets

Detail A

Detail B

CENTRIFUGE BASKET FOR A SCREEN CENTRIFUGE

CROSS-REFERENCE TO RELATED APPLICATIONS

The present application claims the priority benefit of German Application No. 10 2014 001 999.3 filed Feb. 17, 2014, the entirety of which is incorporated herein by reference.

The invention relates to a centrifuge basket for a screen centrifuge, in particular a screen helical-conveyor centrifuge, a push-type centrifuge or a vibrating screen centrifuge, with an outer conical supporting basket and screen segments enclosed in the supporting basket, the supporting basket on its rear edge having an annular groove into which the screen segments are positively inserted.

Such a screen centrifuge is known from DE 10 2004 057 859. In the known centrifuge basket the screen segments are nonpositively fixed on the supporting basket on their forward edge by a clamp ring.

This disadvantage here is that the clamp ring is an additional component which is complex to produce and which also constitutes a rim on the forward edge of the centrifuge basket over which the material which is to be screened is discharged. For this reason the clamp ring is subject to high wear and unwanted deposits form on the rim.

The object of the invention is to develop a centrifuge basket for a screen centrifuge of the initially mentioned type such that it has a simpler construction and improved durability.

This object is achieved as claimed in the invention by a centrifuge basket as claimed in claim 1. Advantageous developments of the invention are given in the dependent claims.

In the centrifuge basket for a screen centrifuge, in particular a screen helical-conveyor, a push-type or a vibrating screen centrifuge, with an outer conical supporting basket and screen segments enclosed in the supporting basket, the supporting basket on its rear edge having an annular groove into which the screen segments are positively inserted, it is especially advantageous that the screen segments on their side facing the supporting basket have at least one clip which is transversed by at least one screw and by means of which the screen segments are detachably fixed on the front edge of the supporting basket.

The rear edge here is defined as the smaller diameter of the conical supporting basket. Conventionally the material which is to be screened is placed on the smaller diameter in the centrifuge basket and then is conditioned in the centrifuge basket. The front edge is accordingly defined as the larger diameter of the conical supporting basket. The conditioned material is discharged from the centrifuge basket over the larger diameter.

The core of the invention is thus that each screen segment on its side facing the supporting basket has at least one clip. The clip is transversed by at least one fastening screw by means of which the screen segment is screwed onto the supporting basket or onto a flange which is located on the supporting basket. By using screws as fasteners, the screen segments are detachably fixed on the supporting basket so that the screen segments can be easily detached and replaced when the wear limit is reached.

For installation, only each individual screen segment need be positively pushed into the groove which is located on the rear smaller diameter of the supporting basket. Then the screen segment on the front edge is screwed by means of a clip which is located on the screen segment on the supporting basket and thus is fixed on the supporting basket. Dismounting and replacement accordingly take place in reverse by first the screw coupling of one screen segment on the front edge of the supporting basket being loosened and then by the screen segment being pulled out of the groove on the rear edge of the supporting basket. The supporting basket is gradually outfitted with screen segments by the supporting basket continuing to be turned by the angle which is covered by one screen segment and then the next screen segment being mounted.

On the rear edge of the supporting basket, i.e. on the smaller diameter of the centrifuge basket, there is a groove in which the screen segments are positively enclosed. Thus the supporting basket on its rear edge through this groove has a peripheral or segmented contact shoulder which extends behind or above the screen segments.

The groove can be made in the supporting basket by metal-cutting. The groove can alternatively by formed by a ring or several ring segments being fastened on the rear edge of the supporting basket, especially welded or screwed, so that between the ring or ring segments and the supporting basket a peripheral groove and a contact shoulder are formed.

This yields a mounting aid which is economical to produce in the form of a threading groove and at the same time end-side fixing of the screen segments by form-fit, mounting being facilitated and for fixing the screen segments only the screen segments having to be screwed on the easily accessible front edge of the supporting basket.

Preferably the screen segments on the sides with which two adjacent screen segments border do not have any connections or attachments to the adjacent screen segments, i.e. that the screen segments among one another are free of connections. In this way it is possible to also replace individual screen segments.

In one especially preferred embodiment the screen segments on their front edge project beyond the supporting basket. This means that the material which has been conditioned in the centrifuge and which is discharged on the front edge from the centrifuge basket is removed via the screen segments without the conditioned material coming into contact with the centrifuge basket itself. The fasteners and screw couplings as well as the supporting basket itself thus always lie in the dumping shadow of the screen segments since they project on the front edge beyond the supporting basket and protect the supporting basket as well as the fasteners such as screws and clips. The supporting basket itself as well as the fastening screws are thus not subject to any abrasion at all and neither to increased wear.

The clips of the screen segments have holes or slots which are transversed by fastening screws and by means of which the screen segments are detachably fixed on the supporting basket. In particular the arrangement of slots is advantageous since in this way the manufacture of the screen segments is less complex and alignment of the screen segment relative to the supporting basket is simplified. After alignment of the screen segment the fastening screws, by means of which the screen segments are screwed on the supporting basket, are inserted through the holes or slots into corresponding threaded holes or threaded blind holes in the supporting basket and screwed tight.

Each screen segment can have several clips on the side facing the supporting basket so that each screen segment at several locations is fixed over the peripheral section of the segment by means of fastening screws on the supporting basket.

Alternatively each screen segment can have a clip which runs over the entire peripheral section of the segment with several holes or slots which are located especially equidistantly, each screen segment at several locations being fixed over the peripheral section by means of fastening screws on the supporting basket.

Preferably the clips are formed by flat bars. In particular the clips can be welded on the screen segments. By using a welded construction especially advantageous and economical production of the screen segments is possible.

Preferably the screen insert of the centrifuge basket is formed from four to twelve, preferably from six segments. This yields an advantageous division of the supporting basket, as a result of which the mounting of the screen segments is facilitated. This means that four to twelve, preferably six screen segments are inserted into the supporting basket and are detachably fixed on the supporting basket.

For special applications it is advantageous if the screen segments are split screen segments or milled screen segments or laser-cut screen segments.

Preferably the supporting basket is self-supporting. Especially preferably the supporting basket is produced in one piece by rolling or casting. Alternatively it can be a welded structure. On its peripheral surface which corresponds to a conical jacket section, the supporting basket can have recesses. These recesses can especially discharge liquid since these screen centrifuges are used especially for conditioning of a wet material, i.e. for solid-liquid separation.

Exemplary embodiments of the invention are described in the drawings and are detailed below.

Figure 1:
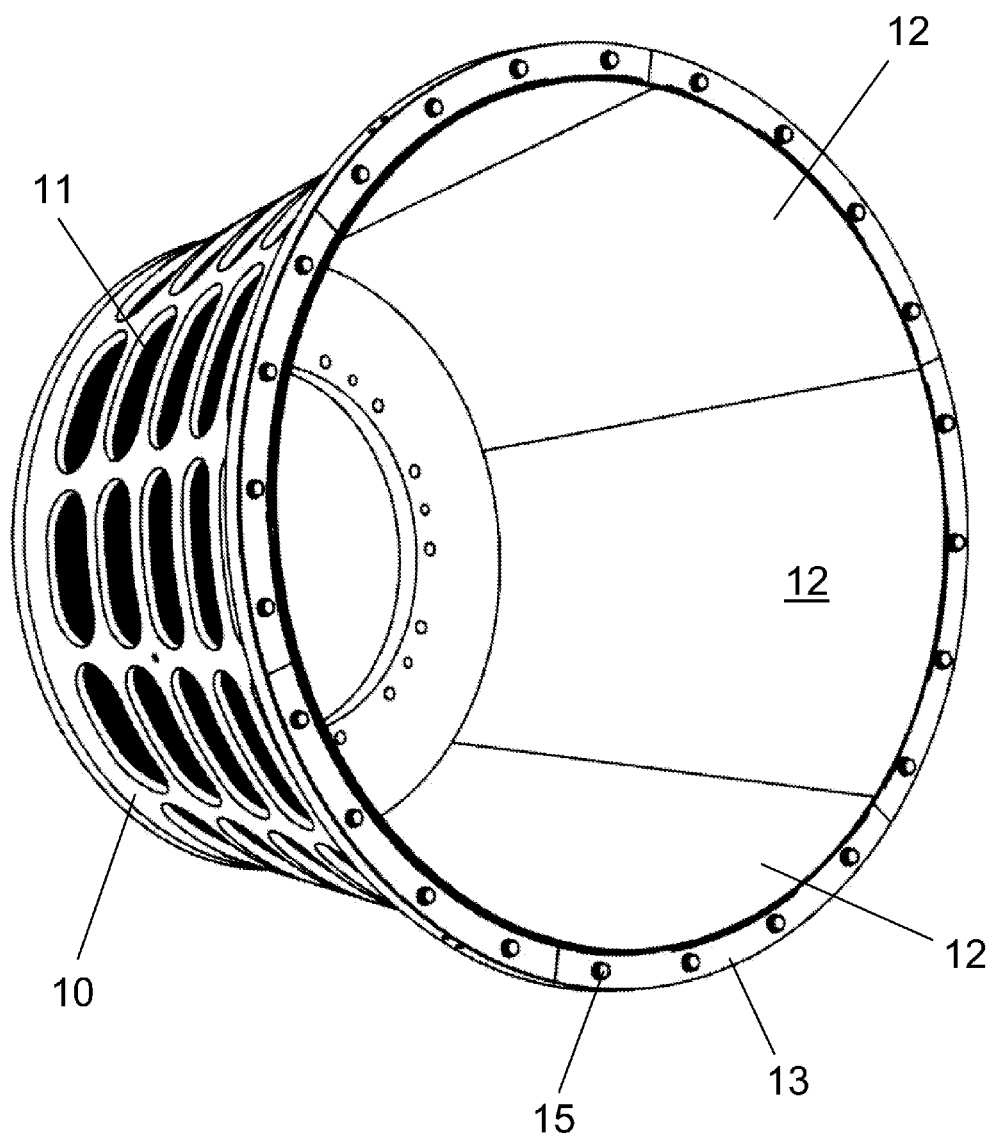
FIG. 1 shows a centrifuge basket for a screen centrifuge in a first embodiment with an outer conical supporting basket and screen segments enclosed in the supporting basket, in a perspective view.

FIG. 1 shows a first embodiment of a centrifuge basket for a screen centrifuge with an outer conical supporting basket 10 and the screen segments 12 enclosed in the supporting basket 10. The material to be conditioned is placed in the conical supporting basket 10 on the back end on the smaller diameter and is then conditioned in the centrifuge basket. The conditioned material is discharged via the front end of the supporting basket 10 with the larger diameter. The supporting basket 10 on its outside has a plurality of recesses 11 through which the liquid which is to be separated in the material which is to be dried is removed. The screen segments 12 on the lateral rims with which two adjacent screen segments 12 border one another do not have any connections or attachments among one another.

Figure 2:
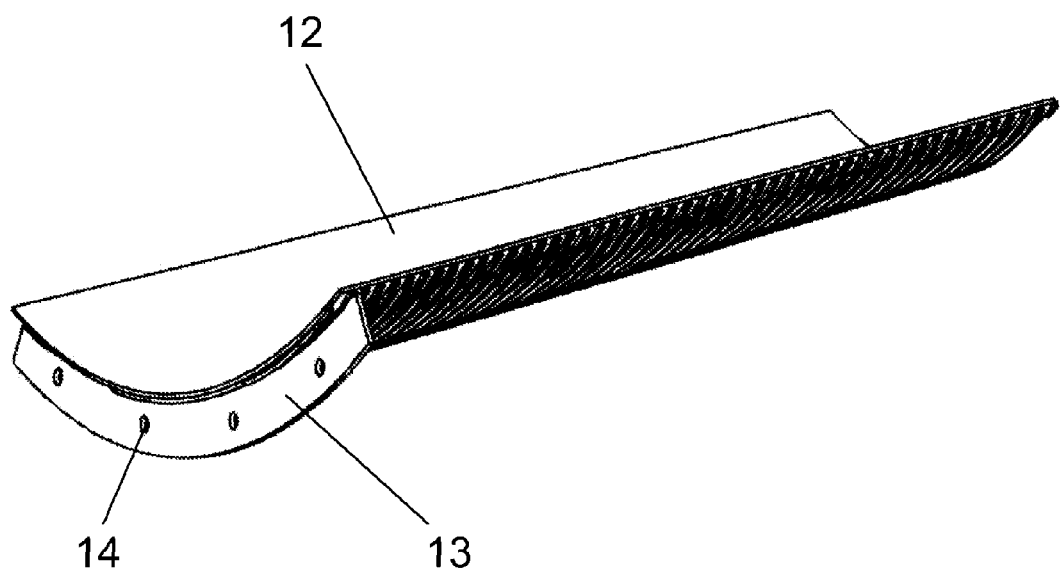
FIG. 2 shows the perspective view of an individual screen segment of the embodiment as shown in FIG. 1.
Figure 3:
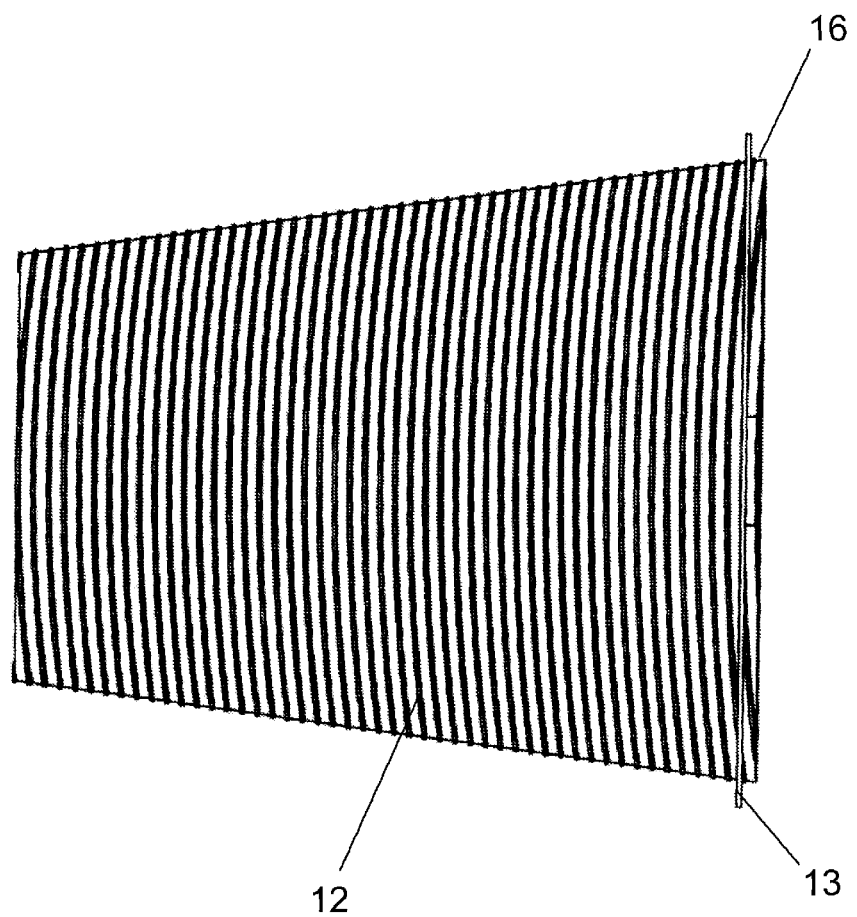
FIG. 3 shows the bottom of the screen segment as shown in FIG. 2.

On the side of the screen segments 12 which is facing the supporting basket 10, clips 13 are welded and run over the entire peripheral section which is overlapped by the screen segment 12 on the supporting basket 10. In the exemplary embodiment which is shown in FIG. 1, a total of six identical screen segments 12 are inserted into the supporting basket 10 and are attached to the supporting basket 10. This means that each screen segment 12 overlaps one peripheral section of 60 degrees of the supporting basket 10. In the exemplary embodiment as shown in FIG. 1 likewise the clips 13 which are welded on the side of the screen segments 12 which faces the supporting basket 10 run over the corresponding peripheral section of 60 degrees. This is furthermore recognizable in FIGS. 2 and 3. FIG. 2 shows a perspective view of one screen segment 12 according to the embodiment as shown in FIG. 1. FIG. 3 shows a bottom view of one screen segment 12 according to the embodiment as shown in FIG. 1. It is recognizable that on the side of the screen segment 12 facing the supporting basket 10 in the installed state a clip 13 is welded which has several holes 14. In the mounted state as is shown in FIG. 1, the holes 14 are transversed by fastening screws 15 by means of which the screen segments 12 are fixed on the supporting basket on the front end of the supporting basket 10.

The screen segment is additionally stiffened by the clip 13 which runs over the entire peripheral section from one side edge of the screen segment 12 to the other side edge of the screen segment so that increased stability of the screen segments results. In this way the stability of the shape of the screen segments is increased and the identical diameter to the supporting basket is ensured.

As can be recognized in FIGS. 2 and 3, the screen segments 12 have a front projecting length 16 which in the mounted state projects forward over the supporting basket 10 and overhangs the supporting basket 10. Since the conditioned material is discharged from the centrifuge basket toward the front larger diameter, this projecting length 16 protects both the supporting basket 10 and also the fastening screws 15 as well as the fastening clips 13 against abrasion since they always lie in the dumping shadow of the front projecting length 16 of the screen segment 12.

Figure 4:
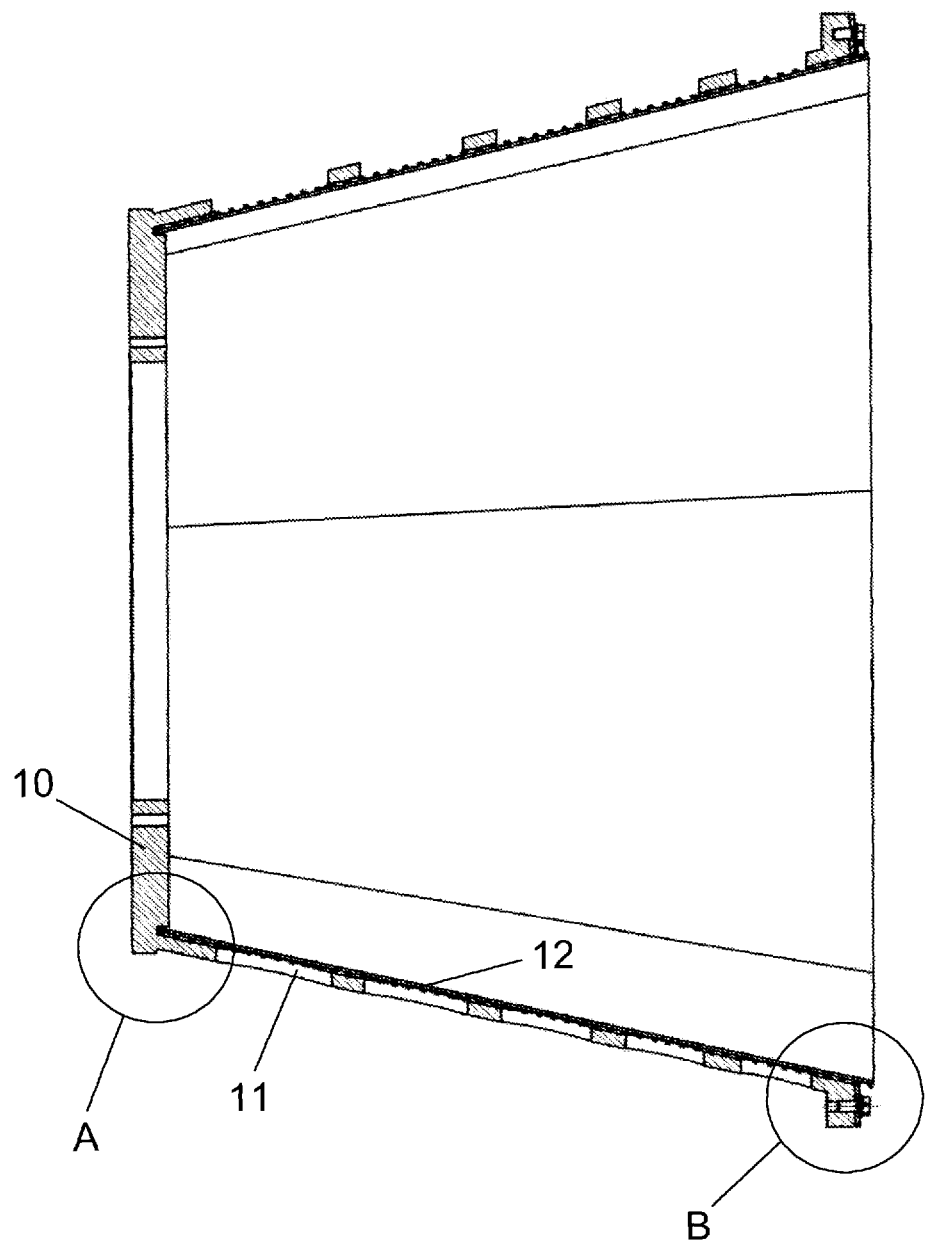
FIG. 4 shows a vertical section through the centrifuge basket with an outer conical supporting basket and screen segments enclosed in the supporting basket, as shown in FIG. 1.
Figure 5:
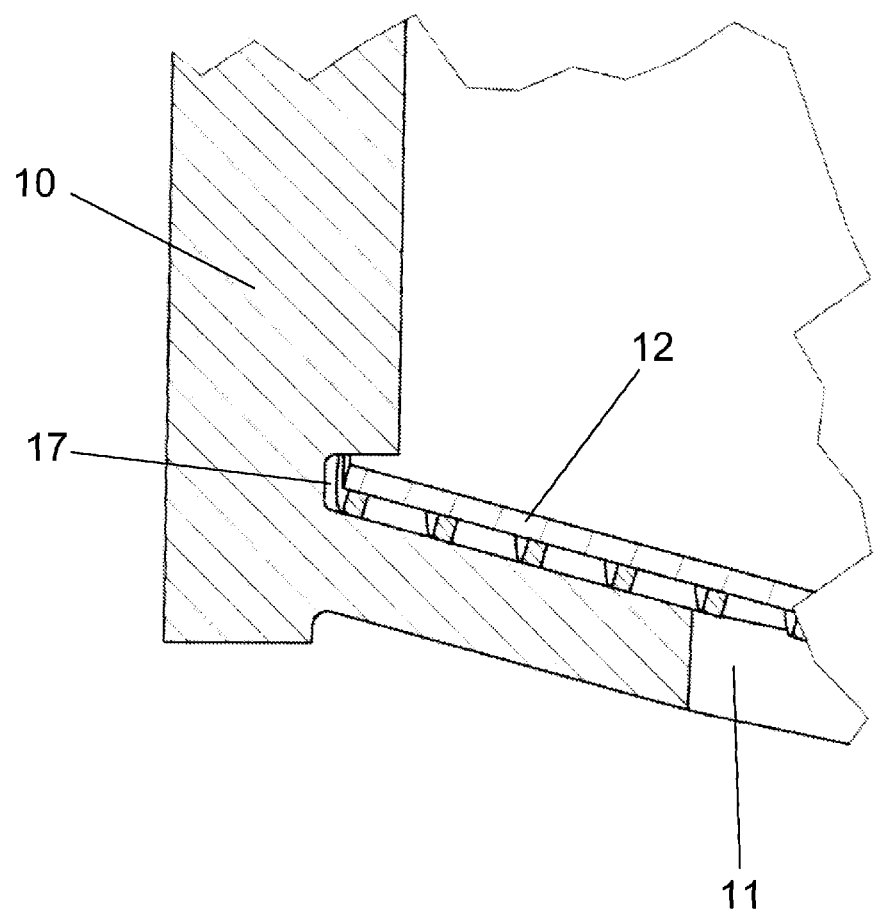
FIG. 5 shows detail A as shown in FIG. 4.
Figure 6:
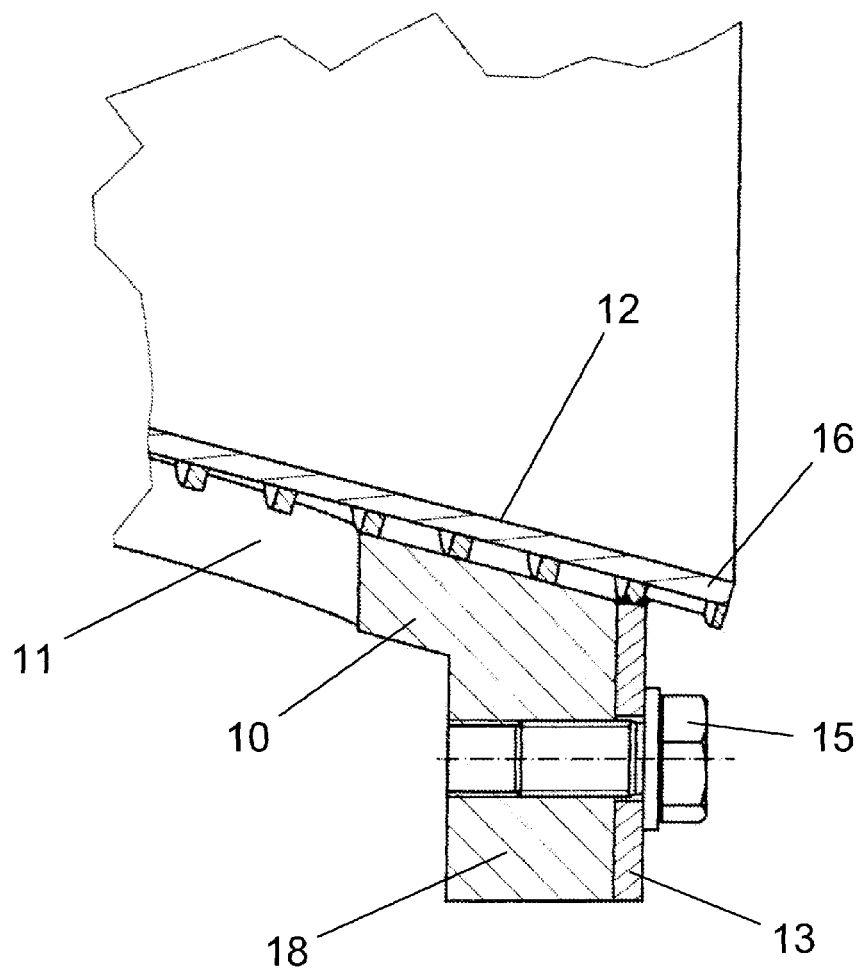
FIG. 6 shows detail B as shown in FIG. 4.

FIG. 4 shows a vertical section through the centrifuge basket as shown in FIG. 1 with the outer conical supporting basket 10 and its recesses 11. The supporting basket 10 encloses the screen segments 12 whose mounting and fastening on the supporting basket 10 are explained using FIGS. 5 and 6. FIG. 5 shows enlarged the detail A as shown in FIG. 4. FIG. 6 shows enlarged the detail B as shown in FIG. 4.

On the smaller diameter of the supporting basket 10 the screen segments 12 are pushed positively into a peripheral groove 17 into the supporting basket 10 as is shown in FIG. 5. The groove 17 runs peripherally over the entire circumference of the supporting basket 10 on its back end with the smaller diameter. The screen segments 12 are positively inserted into the groove 17 and in this way are fixed on the back end of the supporting basket 10. The groove 17 in this exemplary embodiment is made in the supporting basket 10 by metal-cutting.

On the front end the screen segments are fixed by means of fastening screws 15 on the supporting basket 10, as is recognizable in the enlargement of the detail B in FIG. 6. On the side facing the supporting basket 10, the fastening clip 13 is welded on the screen segments 12. The fastening clip 13 lies flat on the flange 18 which is molded in one piece on the supporting basket 10. The fastening clip 13 is transversed by fastening screws 15 which are screwed in threaded holes in the flange 18 which is attached to the supporting basket 10.

Likewise FIG. 6 shows the front projecting length 16 of the screen segments 12 which projects beyond the front end of the supporting basket 10 and thus protects the supporting basket 10 as well as the fastening clip 13 and the fastening screw 15 against wear since the conditioned material which is located in the centrifuge basket after the solid-liquid separation process is gradually discharged forward over the larger diameter of the centrifuge basket, but due to the projection 16 can act neither on the supporting basket 10, its flange 18, nor the fastening clip 13 or the screw 15. In this way the supporting basket 10 with the flange 18 and the fastening screws 15 and the fastening clips 13 are protected against abrasion.

To mount the screen segments 12 in the supporting basket 10, it is simply necessary to thread the screen segments 12 into the groove 16 on the smaller diameter of the supporting basket 10. Thus, on the front end of the supporting basket 10 the fastening screws 15 can be mounted and in this way the screen segments 12 are screwed over the fastening clips 13 on the supporting basket 10 by means of the fastening screws 15.

When the wear limit of the screen segments 12 is reached, the screen segments 12 can be replaced in a likewise simple manner. Due to the fact that the screen segments 12 are not connected among one another in the supporting basket 10, individual screen segments 12 can be released in succession and replaced by the fastening screws 15 being loosened and the screen segments 12 being removed individually from the supporting basket 10 and being replaced by new screen segments 12.

Figure 7:
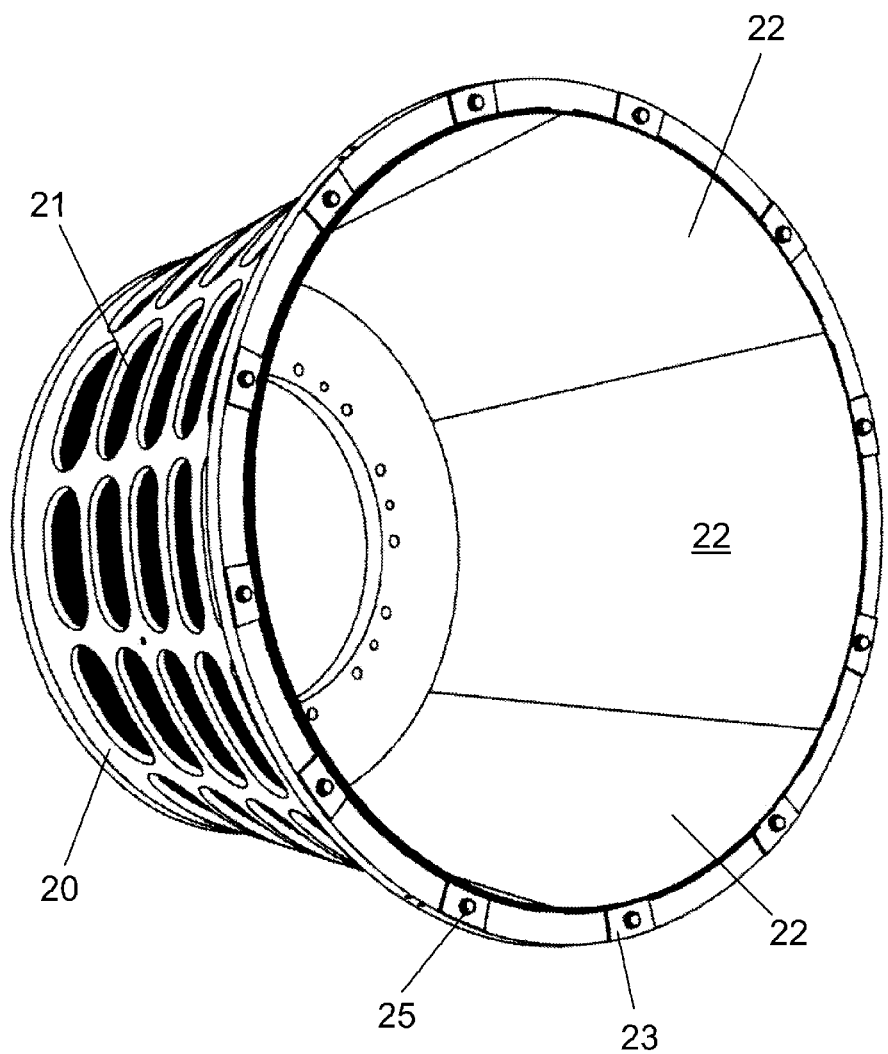
FIG. 7 shows a centrifuge basket for a screen centrifuge in a second embodiment with an outer conical supporting basket and screen segments enclosed in the supporting basket, in a perspective view.

FIG. 7 shows a second embodiment of a centrifuge basket 20 with screen segments 22 enclosed in it, in a perspective view. In the centrifuge basket 20 in turn six identical screen segments 22 are enclosed and each overlap one peripheral segment of 60 degrees of the supporting basket 20. The supporting basket 20 on its peripheral surface in turn has a plurality of recesses 21.

Figure 8:
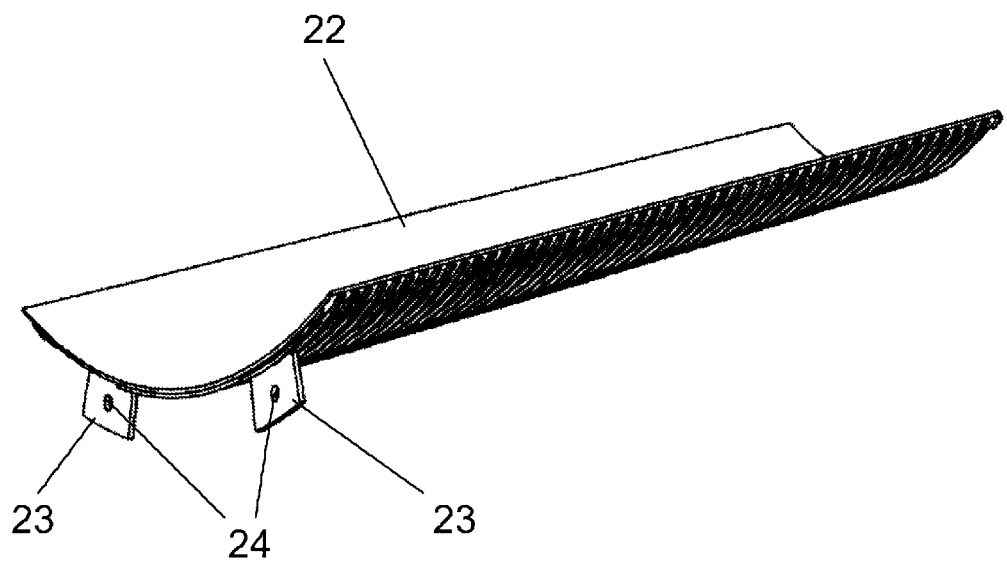
FIG. 8 shows the perspective view of an individual screen segment of the embodiment as shown in FIG. 7.
Figure 9:
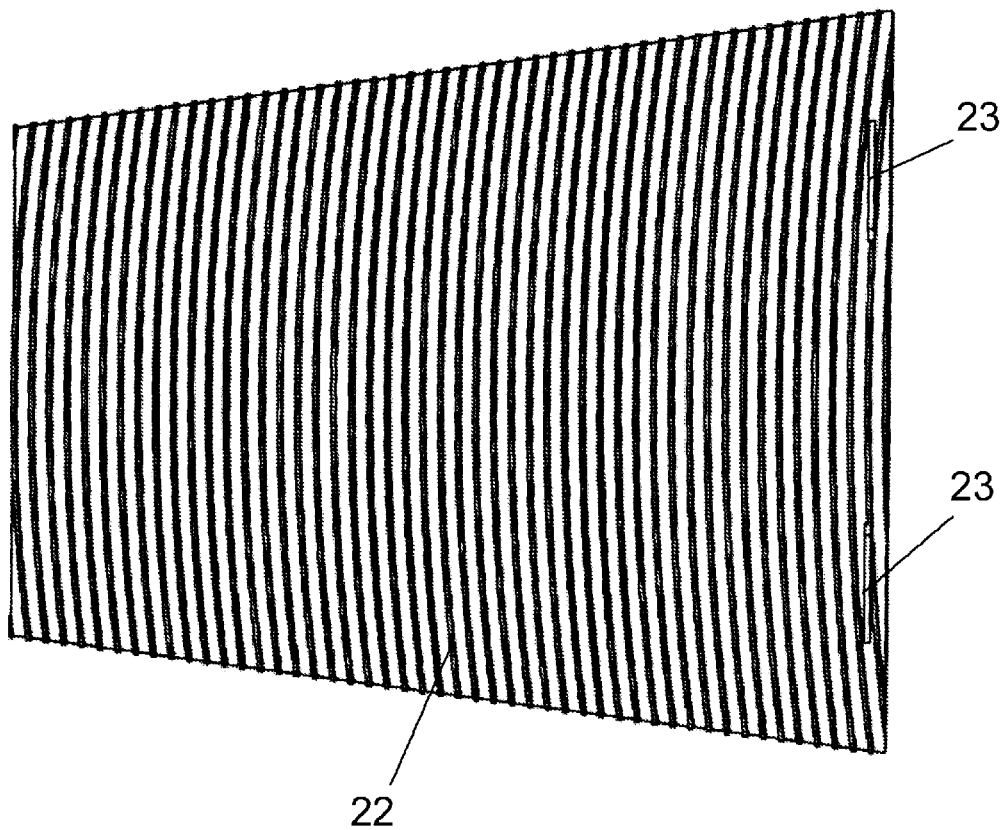
FIG. 9 shows the bottom of the screen segment as shown in FIG. 8.

FIGS. 8 and 9 each show one individual screen segment 22 of the embodiment as shown in FIG. 7. FIG. 8 shows a perspective view of one such screen segment 22. FIG. 9 shows the bottom view of one screen segment 22 according to the second embodiment as shown in FIG. 7.

The screen segments 22 each have two fastening clips 23 on the side which is facing the supporting basket 20 in the mounted state. The fastening clips 23 are in turn provided with through holes 24 which in the mounted state are transversed by fastening screws 25 and by means of which the screen segments 22 are screwed on the supporting basket 20 on its front side. Otherwise the mounting corresponds fundamentally to the first embodiment, i.e. that the screen segments 22 on the smaller diameter of the supporting basket 20 are inserted positively into one peripheral groove in the supporting basket 20 and on the front larger diameter of the supporting basket 20 are screwed by means of the fastening screws 25 on the supporting basket 20.

Figure 10:
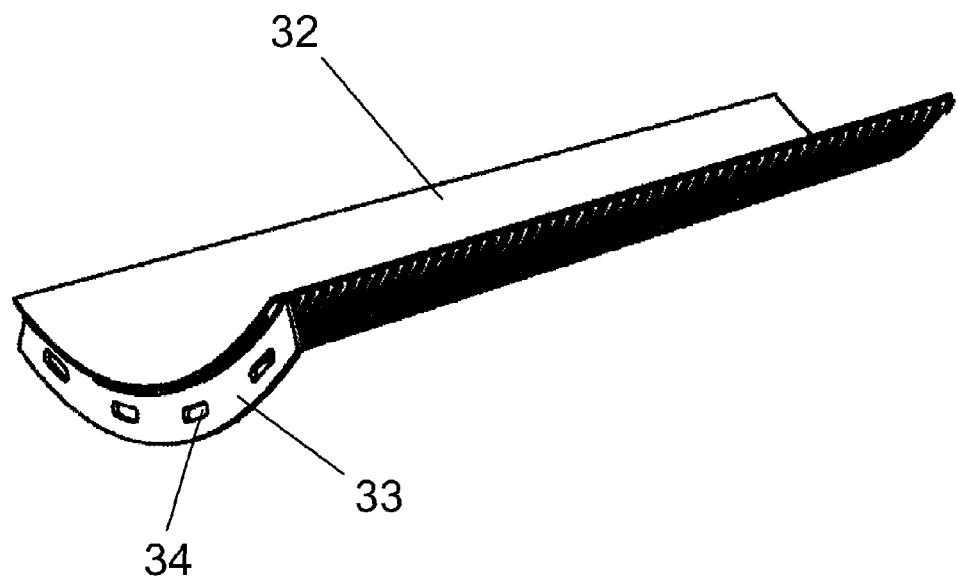
FIG. 10 shows the perspective view of an individual screen segment of a third embodiment.

FIG. 10 shows a perspective view of a third embodiment of a screen segment 32. This screen segment 32 in turn has a welded-on clip 33 which [sic] run over the entire peripheral section which is overlapped by the screen segment 32. Here this fastening clip 33 has several slots 34 which are transversed by fastening screws which are not shown. These slots 34 allow simpler production of the screen segments 32 and furthermore simplify the mounting of the screen segments 32 on the supporting basket since due to the slots 34 it is not necessary to exactly align the screen segments 32 relative to the supporting basket.

Figure 11:
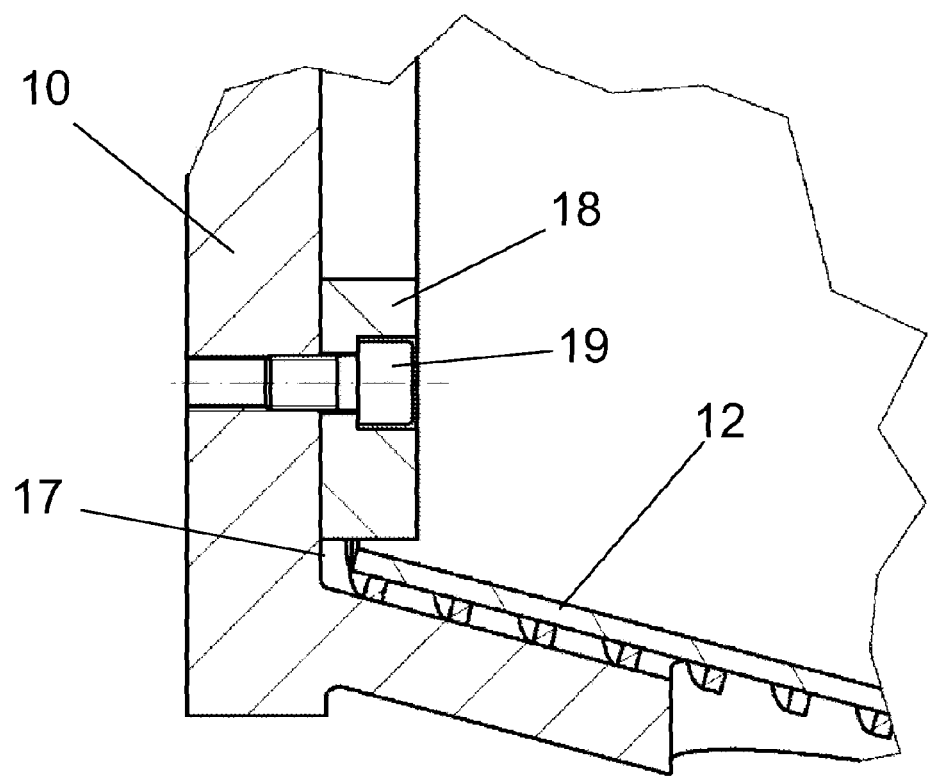
FIG. 11 shows a detail of one alternative configuration of the threading groove on the back end of the supporting basket with enclosed screen segments.

FIG. 11 shows a detail of one alternative configuration of the threading groove 17 on the back end of the supporting basket 10 with enclosed screen segments 12. On the smaller diameter of the supporting basket 10, the screen segments 12 are pushed positively into a peripheral groove 17 into the supporting basket 10, as is shown in FIG. 11. The groove 17 runs peripherally over the entire circumference of the supporting basket 10 on its back end with the smaller diameter. The screen segments 12 are positively inserted into the groove 17 and in this way are fixed on the back end of the supporting basket 10. The groove 17 in the exemplary embodiment according to FIG. 11 is formed by annular segments 18 being screwed by means of fastening screws 19 on the supporting basket 10, as a result of which the peripheral groove 17 is formed.

The invention claimed is:

1. A centrifuge basket for a screen centrifuge selected from the group consisting of screen helical-conveyor centrifuges, push-type centrifuges and vibrating screen centrifuges, wherein said centrifuge basket comprises an outer conical supporting basket having interior sidewalls and a plurality of screen segments positioned peripherally adjacent to each other within the conical supporting basket in front of the conical supporting basket interior sidewalls, each of the plurality of screen segments having a front face, a rear face, a top end, a bottom end and side end borders, the supporting basket comprising a front edge and a rear edge, said rear edge having an interior annular groove into which the bottom end of each of the plurality of screen segments are seated with the rear faces of said screen segments positioned opposite said conical supporting basket interior sidewalls, wherein each screen segments has at least one clip transversed by at least one screw for detachably affixing each said screen segment to the front edge of the conical supporting basket wherein the top ends of each of the plurality of screen segments projects beyond the end of said conical supporting basket front edge.

2. The centrifuge basket of claim 1, wherein each of the plurality of screen segments side end borders do not have any connections or attachments to an adjacent screen segments.

3. The centrifuge basket of claim 2, wherein the at least one clips have openings or slots which are transversed by fastening screws for detachably affixing the plurality of screen segments to the front edge of the conical supporting basket.

4. The centrifuge basket of claim 3, wherein each screen segment has at least one clip which extends over the entire peripheral top end section of the segment with a plurality of openings or slots which are positioned approximately equidistantly from each other, and wherein each screen segment is detachably affixed by fastening screws to front edge of the conical supporting basket.

5. The centrifuge basket of claim 3, wherein the adjacent screen segment borders do not have any connections or attachments to one another.

6. The centrifuge basket of claim 2, wherein each screen segment has a plurality of clips for receiving fastening screws on the front edge of the conical supporting basket.

7. The centrifuge basket of claim 6, wherein each screen segment has at least one clip which extends over the entire peripheral section of the segment with several openings or slots which are positioned approximately equidistantly, and each screen segment at several locations is detachably affixed by fastening screws to front edge of the conical supporting basket.

8. The centrifuge basket of claim 6, wherein the adjacent screen segment borders do not have any connections or attachments to one another.

9. The centrifuge basket of claim 2, wherein each of the plurality of screen segments has at least one clip which extends along the entire top end of the segment and having a plurality of openings or slots which are positioned approximately equidistantly from one another, and each of the plurality of screen segments is detachably affixed by fastening screws to front edge of the conical supporting basket.

10. The centrifuge basket of claim 9, wherein the adjacent screen segment borders do not have any connections or attachments to one another.

11. The centrifuge basket of claim 1, wherein each screen segment has at least one clip which extends over the entire peripheral section of the segment with several openings or slots which are positioned approximately equidistantly, and each screen segment at several locations is detachably affixed by fastening screws to the front edge of the conical supporting basket.

12. The centrifuge basket of claim 11, wherein the at least one clip is formed by flat bars.

13. The centrifuge basket of claim 11, wherein the at least one clip is welded on the screen segment.

14. The centrifuge basket of claim 11, wherein the plurality of screen segments is between 4 to 12, and preferably 6 screen segments.

15. The centrifuge basket of claim 11, wherein the screen segments are split screen segments or milled screen segments or laser-cut screen segments or combinations thereof.

16. The centrifuge basket of claim 11, wherein the adjacent screen segment borders do not have any connections or attachments to one another.

17. A centrifuge basket for a screen centrifuge comprising an outer conical supporting basket and a plurality of adjacent screen segments enclosed in the outer conical supporting basket wherein each of the plurality of screen segments having a front face, a rear face, a top end, a bottom end and side end borders, and wherein the supporting basket has a front edge and a rear edge and further has an annular groove at or near its rear edge into which the bottom end of each of the plurality of adjacent screen segment is inserted and wherein each of the plurality of adjacent screen segments has at least one clip transversed by at least one screw for detachably affixing said screen segments on the front edge of the outer conical supporting basket and further wherein adjacent screen segments are not connected or attached to one another at or near the side end borders.

18. The centrifuge basket of claim 17, for centrifuges selected from the group consisting of screen helical-conveyors, push-type centrifuges and vibrating screen centrifuges.

\* \* \* \* \*